(12) United States Patent
Garden

(10) Patent No.: US 11,835,418 B2
(45) Date of Patent: Dec. 5, 2023

(54) SIMULTANEOUS MULTI-SURFACE NON-CONTACT OPTICAL PROFILER

(71) Applicant: Opto-Alignment Technology, Inc., Indian Trail, NC (US)

(72) Inventor: Rognvald P. Garden, Charlotte, NC (US)

(73) Assignee: OPTO-ALIGNMENT TECHNOLOGY, INC., Indian Trail, NC (US)

( * ) Notice: Subject to any disclaimer, the term of this patent is extended or adjusted under 35 U.S.C. 154(b) by 67 days.

(21) Appl. No.: 17/490,630

(22) Filed: Sep. 30, 2021

(65) Prior Publication Data

US 2023/0099285 A1    Mar. 30, 2023

(51) Int. Cl.
*G01M 11/08* (2006.01)
*G01B 11/24* (2006.01)
*G01B 11/06* (2006.01)

(52) U.S. Cl.
CPC ....... *G01M 11/081* (2013.01); *G01B 11/0616* (2013.01); *G01B 11/24* (2013.01)

(58) Field of Classification Search
CPC ... G01B 11/0616; G01B 11/24; G01M 11/081
See application file for complete search history.

(56) References Cited

U.S. PATENT DOCUMENTS

| | | | |
|---|---|---|---|
| 5,812,265 A | 9/1998 | Hoshiyama | |
| 5,882,301 A * | 3/1999 | Yoshida | A61B 3/10 600/319 |
| 2008/0278729 A1 | 11/2008 | Kim | |
| 2010/0091302 A1 | 4/2010 | Kim | |
| 2011/0050893 A1 | 3/2011 | Lee et al. | |
| 2012/0133957 A1 | 5/2012 | Widman et al. | |

FOREIGN PATENT DOCUMENTS

WO    2016071078 A2    5/2016

* cited by examiner

*Primary Examiner* — Tri T Ton
(74) *Attorney, Agent, or Firm* — COATS & BENNETT, PLLC

(57) ABSTRACT

An optical test system and corresponding method disclosed herein provides highly accurate test data for both sides of a lens simultaneously and efficiently to analyze the surface topography and/or geometric parameters of a lens or lens system. More particularly, the optical test system and corresponding method moves the lens in test plane to align a plurality of points of a test pattern on a lens surface with a vertical axis while probes aligned with the vertical axis and on opposing sides of the lens simultaneously collect wavelength-specific data for both lens surfaces. The optical test system uses the collected wavelength-specific data to produce a surface topography and/or the associated lens geometric parameters for each lens surface.

34 Claims, 12 Drawing Sheets

SIMULTANEOUS MULTI-SURFACE NON-CONTACT OPTICAL PROFILER

BACKGROUND

Optical lenses and lens systems commonly require bulk production of the lenses. To ensure the quality of the resulting lenses satisfies designated quality standards, each lens (or at least a subset of the lenses) is inspected. For example, a surface topography and/or geometric parameters of a lens may be measured and compared to the expected surface topography and design geometry to determine whether the production lens meets corresponding quality standards.

Test systems have been developed to measure the surface topography of a lens. However, these systems typically can only measure one surface at a time and/or one lens at a time, and do not provide surface-to-surface lens geometry information. As a result, the inspection process is very time consuming, and thus costly. Further, conventional systems are limited with respect to the types of lenses they can evaluate. Also, the accuracy of automatic lens test systems is often lower than desirable due to vibrations and thermal expansion that occurs during the test process. Thus, there remains a need for improved lens evaluation systems.

SUMMARY

The solution presented herein provides highly accurate test data for both sides of a lens simultaneously and efficiently to analyze the surface topography and/or geometric parameters of a lens or lens system. More particularly, the solution presented herein moves the lens in a test plane to align a plurality of points of a test pattern on the lens surfaces with a vertical axis while probes aligned with the vertical axis and on opposing sides of the lens simultaneously collect wavelength-specific data. The solution presented herein then processes the collected wavelength-specific data to produce a surface topography and/or the associated geometric parameters for each lens surface.

One exemplary embodiment comprises an optical test system configured to simultaneously measure at least one of a surface topography and one or more geometric parameters of multiple surfaces of at least one lens. The optical test system comprises first and second probes, a lens mount, a motion controller, a chromatic confocal sensor, and a processor. The first and second probes are centered on a vertical axis and movable along the vertical axis. Further, the first and second probes face opposing first and second sides of a test plane, respectively, where the first and second sides of the test plane are perpendicular to the vertical axis. The lens mount is configured to secure a lens in the test plane between the first and second probes. The lens has opposing first and second surfaces, where the first surface of the lens is on the first side of the test plane and the second surface of the lens is on the second test plane. The motion controller is configured to move the lens mount within the test plane to each of a plurality of x-y positions of a test pattern while the first surface of the lens is in a first measurement range of the first probe and the second surface of the lens is in a second measurement range of the second probe for each of the plurality of x-y positions. For each x-y position, the first and second probes simultaneously focus chromatic light onto the corresponding first and second surfaces of the lens and simultaneously collect reflections of the chromatic light off of the corresponding first and second surfaces of the lens. The chromatic confocal sensor is operatively connected to the first and second probes and is configured to detect a surface peak wavelength of each reflection of the first and second surface simultaneously collected by each of the first and second probes for each of the plurality of x-y positions. The processor is operatively connected to the chromatic confocal sensor and is configured to determine a plurality of geometric datum for the lens from a first subset of the detected surface peak wavelengths, and to determine the surface topography and/or the one or more geometric parameters of each of the first and second surfaces of the lens relative to the geometric datum from the remaining detected surface peak wavelengths.

In some exemplary embodiments, the motion controller is further configured to coordinate the moving of the lens mount within the test plane with a moving of the first probe along the vertical axis on the first side of the test plane to maintain the first surface of the lens in the first measurement range of the first probe for each of the plurality of x-y positions. In still more exemplary embodiments, the motion controller is further configured to coordinate the moving of the lens mount within the test plane with a moving of the second probe along the vertical axis on the second side of the test plane to maintain the second surface of the lens in the second measurement range of the second probe for each of the plurality of x-y positions.

In some exemplary embodiments, the motion controller moves at least one of the first and second probes along the vertical axis according to an expected surface topography, e.g., a surface topography defined by an analytical equation or by a 3D model.

In some exemplary embodiments, the motion controller is further operatively connected to the chromatic confocal sensor, where the motion controller moves at least one of the first and second probes along the vertical axis responsive to feedback from the chromatic confocal sensor to follow a contour of the corresponding one of the first surface and the second surface of the lens.

In some exemplary embodiments, the lens comprises a first film disposed on the first surface, where the first film has a thickness defined by a distance between an outer surface of the first film and an inner surface of the first film adjacent the first surface. In this embodiment, the motion controller may further be configured to coordinate the moving of the lens mount within the test plane with the moving of the first probe along the vertical axis on the first side of the test plane to maintain the outer and inner surfaces of the first film in the first measurement range of the first probe for each of the plurality of x-y positions. For each of the x-y position, the first probe is further configured to simultaneously focus chromatic light onto the corresponding outer surface of the first film and to simultaneously collect reflections of the chromatic light off the corresponding outer surface of the first film. The chromatic confocal sensor is further configured to detect a first film peak wavelength of each film reflection off the outer surface of the first film collected by the first probe for each of the plurality of x-y positions, and the processor is further configured to determine a surface topography of the outer surface of the first film from the detected first film peak wavelengths and/or a thickness of the first film at each of the plurality of x-y positions from the detected first film peak wavelength and the corresponding detected surface peak wavelength for each of the plurality of x-y positions. In some embodiments, the optical test system may be further configured to use a similar process to determine a surface topography of an outer surface of a second film and/or a thickness of the second film, where the thickness of the second film is defined by a distance between the outer surface of the second film and an inner surface of the second film adjacent the second surface of the lens.

In some exemplary embodiments, the motion controller is further configured to initialize a location of the lens mount within the test plane by moving the lens mount within the test plane to align a starting point of the test pattern with at a fiducial point of at least one of the first and second surfaces of the lens. The fiducial point may comprise, for example, a maximum point or a minimum point of at least one of the first and second surfaces of the lens.

In some exemplary embodiments, the first probe, the second probe, and the lens mount are secured to a frame system having a coefficient of thermal expansion less than $1.5 \times 10^{-6}$ per degree Kelvin. The frame system is configured to align the first and second probes along the vertical axis on the opposing first and second sides of the test plane, to secure the lens mount in the test plane between the first and second probes, and to control motion deviations of the first and second probes and the lens mount due to thermal expansion and vibrations. In some embodiments, the frame system comprises a nickel-iron alloy (e.g., 64FeNi) frame system or a granite frame system.

In some exemplary embodiments, the frame system comprises a base plate, a vertical mounting plate, and first and second vertical axis translation stages. The base plate is disposed between and perpendicular to first and second side supports, where the base plate is perpendicular to the vertical axis. The vertical mounting plate is structurally secured to the base plate. The first and second vertical axis translation stages are mounted to the vertical mounting plate and respectively secured to the first and second probes.

In some exemplary embodiments, the lens mount comprises a tray, an insert, and a lock mechanism. The tray is secured to the frame system. The insert is configured to hold the lens. The lock mechanism is configured to secure the insert within the tray. In some exemplary embodiments, the lock mechanism comprises a set screw or a magnetic lock mechanism.

In some exemplary embodiments, the test pattern comprises one of a concentric pattern, a raster pattern, and a free-form pattern.

In some exemplary embodiments, the lens mount is configured to secure a plurality of lenses in the test plane, where each of the plurality of lenses has corresponding ones of the opposing first and second surfaces. In such exemplary embodiments, the motion controller is further configured to move the lens mount within the test plane to align a starting point of the test pattern with a fiducial point of one of the first and second surfaces of each lens before moving the lens mount for the corresponding lens to generate the reflections used by the processor to determine the surface topography and/or the one or more geometric parameters of the corresponding lens.

In some exemplary embodiments, the plurality of geometric datum comprises at least two of tilt datum, clock datum, and centration datum.

One exemplary embodiment comprises a method of measuring at least one of a surface topography and one or more geometric parameters of multiple surfaces of at least one lens using an optical test system comprising first and second probes and a lens mount. The first and second probes are centered on a vertical axis and movable along the vertical axis, where the first and second probes face opposing first and second sides of a test plane, respectively, and the first and second sides of the test plane are perpendicular to the vertical axis. The lens mount is configured to secure a lens in the test plane between the first and second probes, where the lens has opposing first and second surfaces, and where the first surface of the lens is on the first side of the test plane and the second surface of the lens is on the second side of the test plane. The method comprises moving the lens mount within the test plane to each of a plurality of x-y positions of a test pattern while the first surface of the lens is in a first measurement range of the first probe and the second surface of the lens is in a second measurement range of the second probe for each of the plurality of x-y positions. While the lens mount move, the first and second probes simultaneously focus chromatic light onto the corresponding first and second surfaces of the lens for each of the plurality of x-y positions, and simultaneously collect reflections of the chromatic light for each of the plurality of x-y positions. The method further comprises detecting a surface peak wavelength of each reflection off the first and second surfaces simultaneously collected by each of the first and second probes for each of the plurality of x-y positions, determining a plurality of geometric datum for the lens from a first subset of the detected surface peak wavelengths, and determining the surface topography and/or the one or more geometric parameters of each of the first and second surfaces of the lens relative to the geometric datum from the remaining detected surface peak wavelengths.

In some exemplary embodiments, the method further comprises coordinating the moving of the lens mount within the test plane with a moving of the first probe along the vertical axis on the first side of the test plane to maintain the first surface of the lens in the first measurement range of the first probe for each of the plurality of x-y positions.

In some exemplary embodiments, the method further comprises coordinating the moving of the lens mount within the test plane with a moving of the second probe along the vertical axis on the second side of the test plane to maintain the second surface of the lens in the second measurement range of the second probe for each of the plurality of x-y positions.

In some exemplary embodiments, the moving the first and second probes comprises moving at least one of the first and second probes along the vertical axis according to an expected surface topography. In some exemplary embodiments, the expected surface topography a topography defined by an analytical equation or by a 3D model.

In some exemplary embodiments, the moving the first and second probes comprises moving at least one of the first and second probes along the vertical axis responsive to feedback from the chromatic confocal sensor to follow a contour of the corresponding one of the first and second surfaces of the lens.

In some exemplary embodiments, the lens comprises a first film disposed on the first surface, where the first film has a thickness defined by a distance between an outer surface of the first film and an inner surface of the first film adjacent the first surface. For such embodiments, the method further comprises coordinating the moving of the lens mount within the test plane with the moving of the first probe along the vertical axis on the first side of the test plane to maintain the outer and inner surfaces of the first film in the first measurement range of the first probe for each of the plurality of x-y positions while the first and second probes simultaneously focus chromatic light onto the corresponding outer surface of the first film lens for each of the plurality of x-y positions and simultaneously collect reflections of the chromatic light off of the corresponding outer surface of the first film for each of the plurality of x-y positions. The method further comprises detecting a first film peak wavelength of each reflection off the outer surface of the first film collected by the first probe for each of the plurality of x-y positions, and determining a surface topography of the outer surface of the first film from the detected first film peak wavelengths and/or a thickness of the first film at each of the plurality of x-y positions from the detected first film peak wavelength and the corresponding detected surface peak wavelength for each of the plurality of x-y positions. In some exemplary embodiments, the lens also comprises a second film disposed on the second surface, where the second film has a thickness defined by a distance between an outer surface of the second film and an inner surface of the second film adjacent the second surface. For such embodiments, the method further comprises coordinating the moving of the lens mount within the test plane with the moving of the second probe along the vertical axis on the second side of the test plane to maintain the outer and inner surfaces of the second film in the second measurement range of the second probe for each of the plurality of x-y positions while the first and second probes simultaneously focus chromatic light onto the corresponding outer surface of the second film lens for each of the plurality of x-y positions and simultaneously collect reflections of the chromatic light off of the corresponding outer surface of the second film for each of the plurality of x-y positions. The method further comprises detecting a second film peak wavelength of each reflection off the outer surface of the second film collected by the second probe for each of the plurality of x-y positions, and determining a surface topography of the outer surface of the second film from the detected second film peak wavelengths and/or a thickness of the second film at each of the plurality of x-y positions from the detected second film peak wavelength and the corresponding detected surface peak wavelength for each of the plurality of x-y positions.

In some exemplary embodiments, the lens comprises a first film disposed on the first surface, where the first film has a thickness defined by a distance between an outer surface of the first film and an inner surface of the first film adjacent the first surface. For such embodiments, the moving the lens mount within the test plane comprises moving the lens mount within the test plane while the outer and inner surfaces of the first film are in the first measurement range of the first probe for each of the plurality of x-y positions while the first probe is further configured to simultaneously focus chromatic light onto the corresponding outer surface of the first film for each of the plurality of x-y positions and simultaneously collect reflections of the chromatic light off of the corresponding outer surface of the first film for each of the plurality of x-y positions. The method further comprises detecting a first film peak wavelength of each reflection off the outer surface of the first film collected by the first probe for each of the plurality of x-y positions and determining a surface topography of the outer surface of the first film from the detected first film peak wavelengths and/or a thickness of the first film at each of the plurality of x-y positions from the detected first film peak wavelength and the corresponding detected surface peak wavelength for each of the plurality of x-y positions. In some exemplary embodiments, the lens also comprises a second film disposed on the second surface, said second film having a thickness defined by a distance between an outer surface of the second film and an inner surface of the second film adjacent the second surface. For such embodiments, the moving the lens mount within the test plane comprises moving the lens mount within the test plane while the outer and inner surfaces of the second film are in the second measurement range of the second probe for each of the plurality of x-y positions while the second probe is further configured to simultaneously focus chromatic light onto the corresponding outer surface of the second film for each of the plurality of x-y positions and simultaneously collect reflections of the chromatic light off of the corresponding outer surface of the second film for each of the plurality of x-y positions. The method further comprises detecting a second film peak wavelength of each reflection off the outer surface of the second film collected by the first probe for each of the plurality of x-y positions and determining a surface topography of the outer surface of the second film from the detected second film peak wavelengths and/or a thickness of the second film at each of the plurality of x-y positions from the detected second film peak wavelength and the corresponding detected surface peak wavelength for each of the plurality of x-y positions.

In some exemplary embodiments, the method further comprises initializing a location of the lens mount within the test plane by moving the lens mount within the test plane to align a starting point of the test pattern with a fiducial point of at least one of the first and second surfaces of the lens. In some exemplary embodiments, the fiducial point comprises a maximum point or a minimum point of at least one of the first and second surfaces the lens. In some exemplary embodiments, the test pattern comprises one of a concentric pattern, a raster pattern, and a free-form pattern.

One exemplary embodiment comprises an optical test system for simultaneously measuring at least one of a surface topography and one or more geometric parameters of multiple surfaces of at least one lens. The optical test system comprises a frame system, first and second vertical axis translation stages, first and second probes, an x-y translation stage, and a lens mount. The frame system is constructed from material having a coefficient of thermal expansion less than $1.5 \times 10^{-6}$ per degree Kelvin and comprises a base plate and a probe mounting plate. The base plate is perpendicular to a vertical axis (102). The probe mounting plate is structurally secured to the base plate and comprises a first and second vertical segments and a connecting segment. The first vertical segment is parallel to the vertical axis and disposed above a top surface of the base plate, while the second vertical segment is parallel to the vertical axis and disposed below a bottom surface of the base plate. The connecting segment spans from the first vertical segment around a side surface of the base plate and is spaced from the side surface to the second vertical segment. The first vertical axis translation stage mounts to a first front surface of the first vertical segment of the probe mounting plate, where the first front surface is parallel to the vertical axis, and where the first vertical axis translation stage is configured to move along the vertical axis above the top surface. The second vertical axis translation stage mounts to a second front surface of the second vertical segment of the probe mounting plate, where the second front surface is parallel to the vertical axis, and where the second vertical axis translation stage is configured to move along the vertical axis (102) below the bottom surface. The first and second probes are structurally secured to the first and second vertical axis translation stages, respectively, and centered on the vertical axis, where the first and second probes face opposing first and second sides, respectively, of the test plane. The x-y translation stage mounts to the base plate between the first and second probes and is configured to move a lens mount secured to the x-y translation stage within a test plane in x- and y-directions according to a test pattern, where the x-y translation stage is configured to sequentially align each test point in the test pattern with the vertical axis. The lens mount secures a lens in the test plane between the first and second probes.

In some exemplary embodiments, the frame system comprises a nickel-iron alloy frame, e.g., 64FeNi, system or a granite frame system.

In some exemplary embodiments, the lens mount comprises a tray secured to the second vertical segment comprises a top and a bottom separated by the front surface, where at least the top is perpendicular to the front surface, and where at least a portion of the top of the second vertical segment is structurally secured to at least a portion of the bottom surface of the base plate.

DETAILED DESCRIPTION

Figure 1:
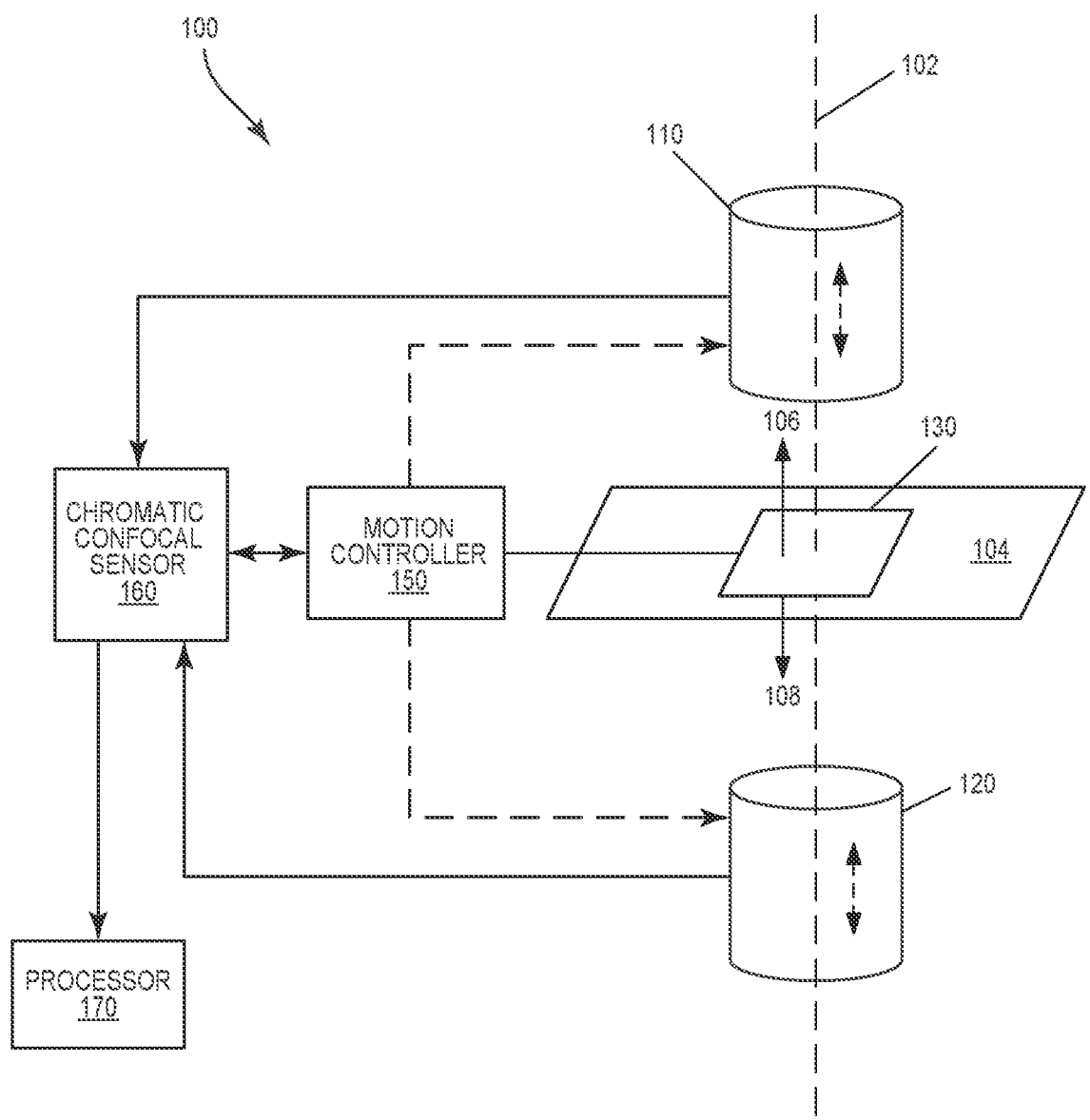
FIG. 1 shows a block diagram of an exemplary optical test system according to exemplary embodiments of the solutions presented herein.
Figure 3:
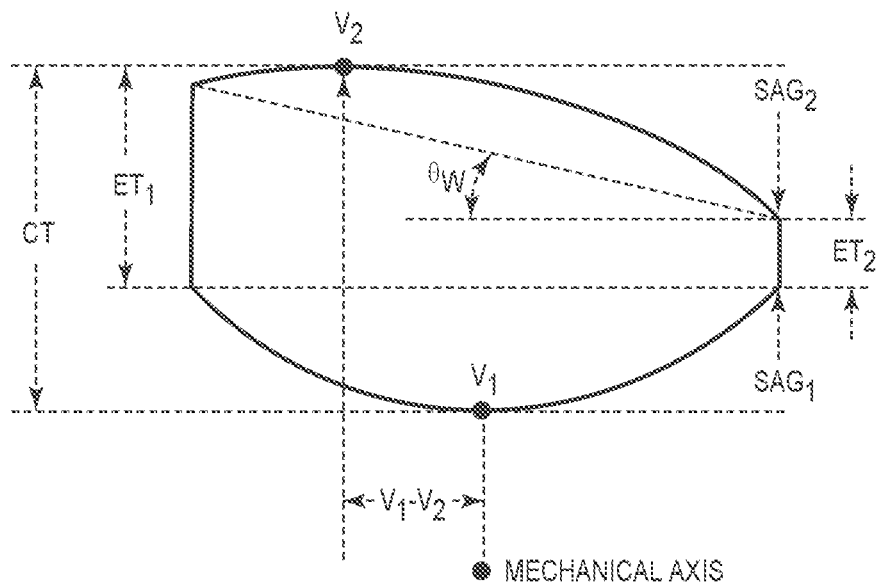
FIG. 3 shows exemplary geometric parameters used by the solutions presented herein.
Figure 5:
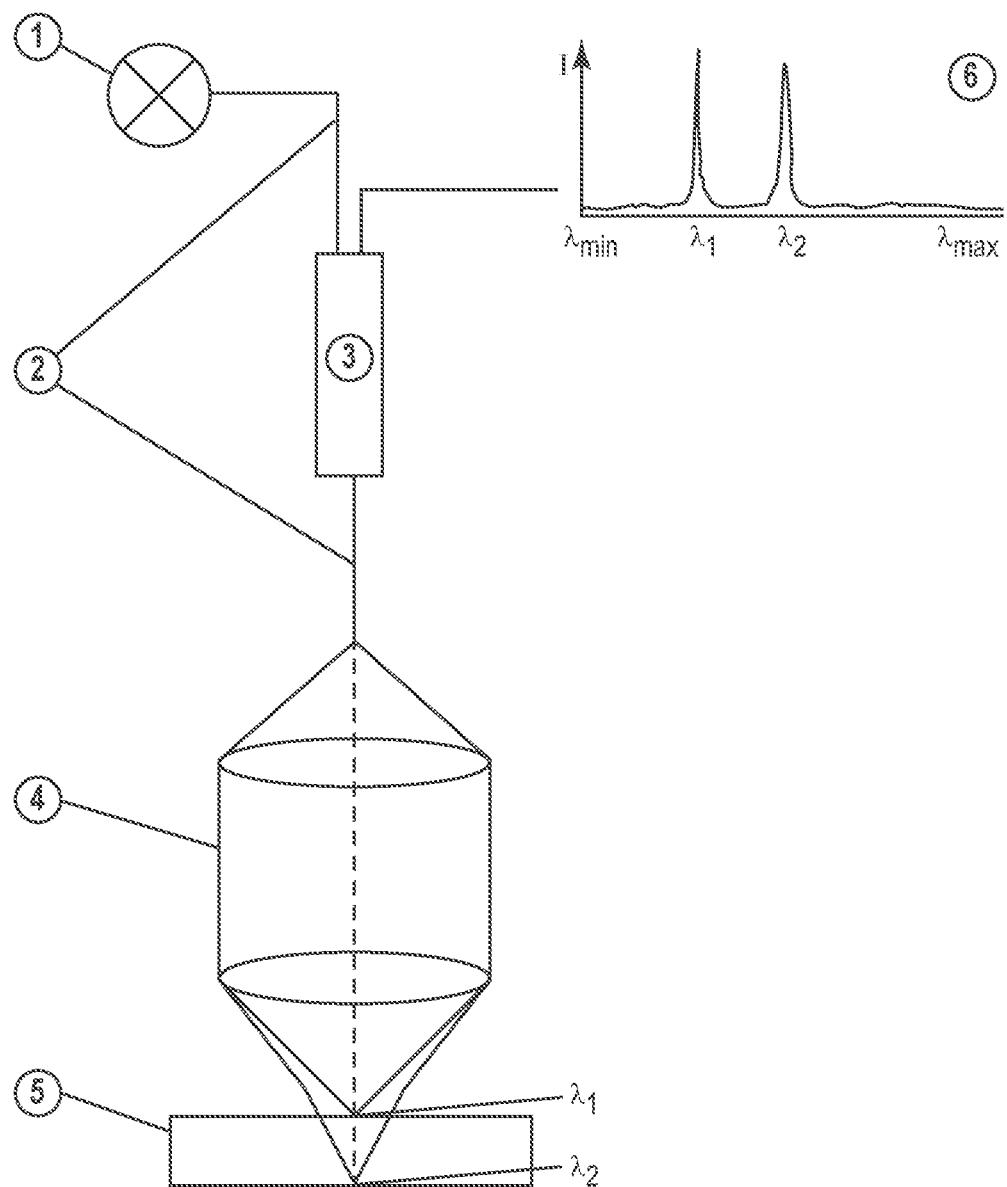
FIG. 5 shows an example of measuring a film thickness according to embodiments of the solution presented herein.

FIG. 1 shows an optical test system 100 according to the solution presented herein. The optical test system 100 comprises a first probe 110, a second probe 120, a lens mount 130 in a test plane 104, a motion controller 150, a chromatic confocal sensor 160 (also referred to herein as sensor 160), and a processor 170. As shown in FIG. 1, the first and second probes 110, 120 are centered on a vertical axis 102 and respectively face opposing sides 106, 108 of the test plane 104. The lens mount 130 is configured to hold a lens 140 in the test plane (FIGS. 3 and 5). The motion controller 150 operatively connects to the lens mount 130 to move the lens mount 130 to move the lens 140 within the test plane 104 in an x-direction and/or a y-direction to each of a plurality of x-y positions 156 in a test pattern 152. As discussed further below, the motion controller 150 may also operatively connect to the first probe 110 and/or the second probe 120 to move one or both of the first and second probes 110, 120 along the vertical axis 102 in the z-direction. Regardless of whether the motion controller 150 moves the probe(s) 110, 120, the first and second probes 110, 120 focus chromatic light provided by the chromatic confocal sensor 160 on the corresponding surface 142, 144 of the lens 140 and capture any reflections of the chromatic light off the corresponding surface 142, 144. These chromatic reflections provide wavelength-specific data related to the distance between the probes 110, 120 and the corresponding surface 142, 144 of the lens 140, and thus related to the surface topography of each surface 142, 144 of the lens 140. The processor 170 processes the wavelength-specific data to determine the surface topography and/or one or more geometric parameters of each lens surface 142, 144. More particularly, the processor 170 identifies a peak wavelength from each chromatic reflection at each x-y position 156, where each peak wavelength corresponds to a distance between the probe 110, 120 and the corresponding surface 142, 144 at the corresponding x-y position 156. The processor 170 uses these distances to determine the surface topography of each surface.

Figure 2:
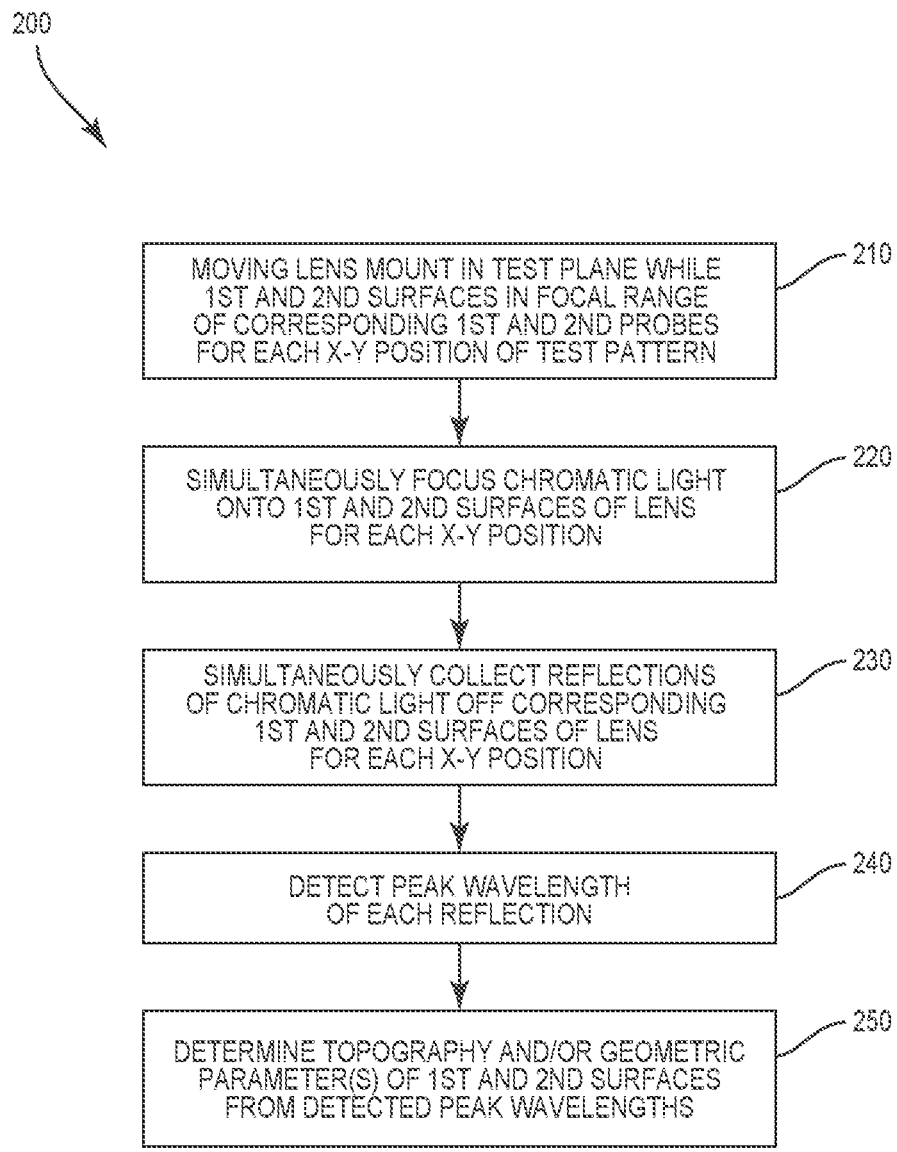
FIG. 2 shows a method of evaluating one or more lenses according to exemplary embodiments of the solutions presented herein.

FIG. 2 shows an exemplary method 200 of measuring a surface topography and/or one or more geometric parameters of multiple surfaces 142, 144 of at least one lens 140 using the optical test system 100 of FIG. 1. The method 200 comprises the motion controller 150 moving the lens mount 130 in the test plane 104 to each of a plurality of x-y positions 156 of a test pattern 152 (e.g., FIGS. 4A-4C) to align each of the x-y positions 156 of the test pattern 152 with the vertical axis 102 while the first surface 142 of the lens 140 is in a first measurement range, i.e., focal range, of the first probe 110 and the second surface 144 of the lens 140 is in a second measurement range, i.e., focal range, of the second probe 120 (block 210). For each of the plurality of x-y positions 156 of the test pattern 152, the first and second probes 110, 120 simultaneously focus chromatic light onto the corresponding first and second surfaces 142, 144 of the lens 140 (block 220) and simultaneously collect reflections of the chromatic light (block 230). The chromatic confocal sensor 160 detects the peak wavelength(s) of each reflection off the first and second surfaces 142, 144 simultaneously collected by each of the first and second probes 110, 120 for each of the plurality of x-y positions 156 (block 240). Processor 170 determines a plurality of geometric datum for the lens 140 from a first subset of the detected peak wavelengths and determines the surface topography and/or geometric parameter(s) of each of the first and second surfaces 142, 144 of the lens 140 relative to the geometric datum from the remaining detected peak wavelengths (block 250). As a result, the optical test system 100 of the solution presented herein simultaneously measures a surface topography and/or geometric parameter(s) of multiple surfaces 142, 144 of a lens 140, which enables both surfaces 142, 144 of the lens 140 to be evaluated in a time efficient manner.

A Light Emitting Diode (LED) (not shown) provides the chromatic light used by the optical test system 100. The LED may be incorporated into the optical test system 100 using any known means. For example, the LED may be part of the chromatic confocal sensor 160, where an optical fiber carries the chromatic light to the first and second probes 110, 120 to project the light onto the corresponding first and second surfaces 142, 144. In another example, the LED and a corresponding probe are integrated inside the optical test system 100 in a compact sensor system, e.g., with the probes 110, 120. Because LEDs generate heat, using the remote exemplary implementation reduces heat within the optical test system 100, and thus may improve the thermal stability of the optical test system 100.

As noted above, processor 170 determines the surface topography and/or the one or more geometric parameters of each surface 142, 144 from the detected peak wavelengths. To that end, processor 170 first determines a plurality of geometric datum for the lens 140 from a first subset of the detected peak wavelengths. Exemplary geometric datum include, but are not limited to, tilt, clock, centration, e.g., as shown in FIG. 3. For example, the processor 170 may determine the tilt from wavelength(s) reflected off a defined flat surface on surface 142, 144, may determine the centration from wavelength(s) reflected off an edge (e.g., outer diameter) of the lens 140, and/or may determine the clock from wavelengths reflected off a fiducial point around an edge or at the side of the lens 140. In other embodiments, fiducial marks may be embossed on the surface of the lens 140. Because these fiducial marks are patterned (e.g., cross) and are either lower or higher than the lens surface, the processor 170 can differentiate the reflections from the fiducial marks from the reflections off the lens surface 142, 144, and thus can differentiate these fiducial marks from the actual lens surface in the 3D point cloud. For example, the processor 170 may use the centroid of each fiducial mark to center the determined surface topography in the x-direction and the y-direction, and may use the clock to remove rotations the determined surface topography in phi. The processor 170 may further remove the surface tilt by fitting a plane to the z-heights of the fiducial marks. Hence the optical test system 100 may use the three (or more) fiducial marks to provide centration and tilt geometric datums that can be measured by the optical test system 100 without any additional sensors.

Once the processor 170 determines the geometric datum, the processor 170 uses the remaining detected peak wavelengths, e.g., the peak wavelengths corresponding to reflections off the lens surfaces 142, 144, to determine the surface topography and/or geometric parameter(s) of each of the first and second surfaces 142, 144 of lens 140 relative to the geometric datum. By determining the surface topography relative to the geometric datum, the processor 170 accounts for various errors, e.g., errors caused by tilt, that would have otherwise been introduced to the determined surface topography. For example, the processor 170 first collects three dimensional (e.g., x, y, z) point cloud maps for the tilt (i.e., flat), centration (i.e., edge), and clock (i.e., fiducial mark) geometric datums, which the processor 170 uses to define a six-axis coordinate frame (e.g., x, y, z, $\theta_x$, $\theta_y$, $\theta_z$) to uniquely define the position of the lens 140 in space. The processor 170 then measures the first and second surfaces 142, 144 without removing the lens 140 from the lens mount 130, and thus directly relates the lens surfaces 142, 144 to the defined six-axis coordinate frame. The coordinate frame may then be translated along/around any axis as a fixed body to assist the processor 170 with fitting known surface shapes (e.g., known analytically or via a 3D model) to each surface 142, 144. In so doing, the processor 170 determines surface topography and/or one or more geometric parameters of the lens 140. As shown in FIG. 3, exemplary geometric parameters include, but are not limited to, vertex-to-vertex offset ($V_1$-$V_2$), top-to-bottom wedge angle ($\theta_w$), top-to-bottom center thickness (CT), top-to-bottom edge thickness ($ET_1$, $ET_2$), edge thickness variation ($ET_1$-$ET_2$), radius of curvature ($R_1$, $R_2$), and/or top and bottom sag error ($Sag_1$, $Sag_2$) relative to the nominal shape/form.

Figure 4A:
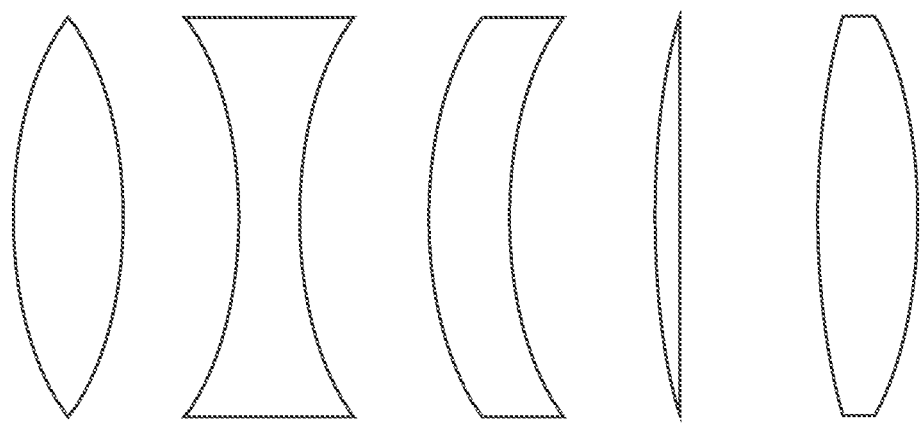
FIGS. 4A-4D show exemplary lenses for the solutions presented herein.
Figure 4B:
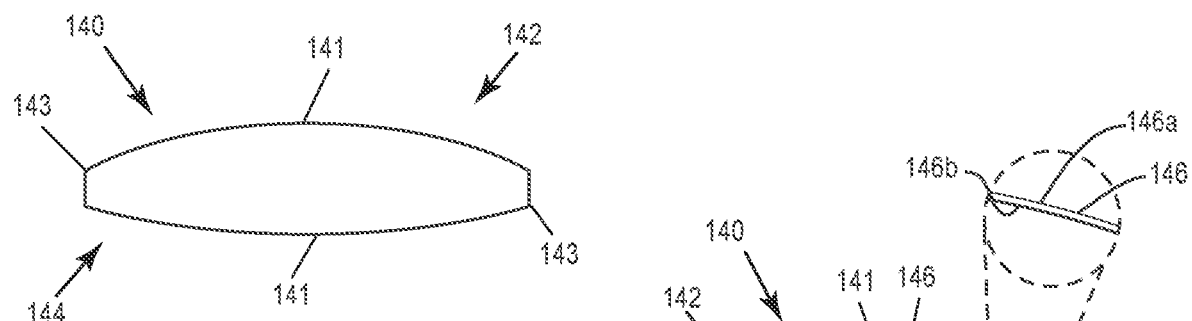
Figure 4C:
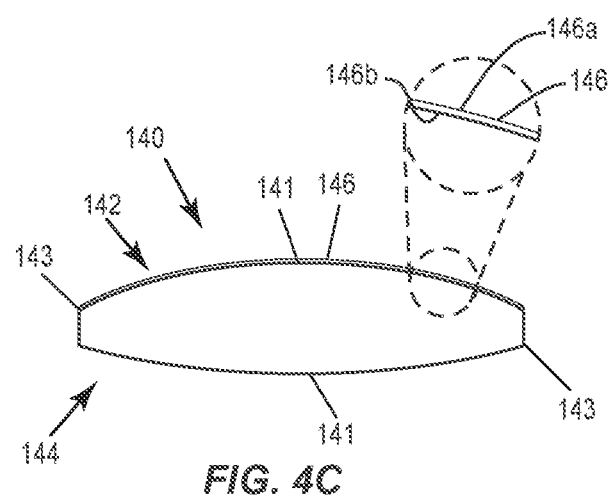
Figure 4D:
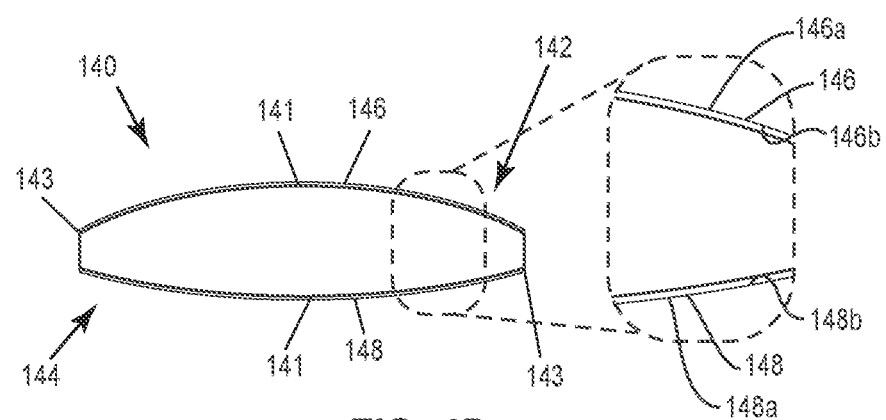

The optical test system 100 may be used to measure the surface topography and/or geometric parameter(s) of any lens, e.g., the lenses shown in FIG. 4A. It will be appreciated the optical test system 100 is not limited to the conventional lenses shown in FIG. 4A. Rather, the optical test system 100 may be configured to measure any lens surface topography, including but not limited to, concave topographies, convex topographies, rotationally symmetric topographies, non-axially symmetric topographies, freeform shapes, etc. Further, as shown in FIGS. 4C and 4D, and as discussed further below, the optical test system may be configured to measure surface topographies and/or thickness of any one or more film(s) 146, 148 disposed on one or both surfaces of the lens 140.

In addition to controlling the movement of the lens mount 130, the motion controller 150 may also control the movement of one or both of the first and second probes 110, 120 to ensure each surface 142, 144 of the lens 140 remains in the measurement range of the corresponding probe 110, 120. In other words, the motion controller 150 configures the first and/or second probes 110, 120 to move along the vertical axis 102 in the z-direction on the corresponding side 106, 108 of the test plane 104 to track the corresponding surface 142, 144 of the lens 140 (e.g., using autofocus, form following via known shape, etc.). Using the solution presented herein, such tracking may be accomplished at up to 10 kHz, i.e., essentially real time.

In some exemplary embodiments, the movement of one or more of the probes 110, 120 only occurs to initialize the location of the probe(s) 110, 120 with respect to the lens 140. For example, when one or more surfaces 142, 144 are flat, the motion controller 150 may initialize the location of the probe(s) 110, 120 by moving the corresponding probe(s) 110, 120 along the z-direction to place the corresponding probe(s) 110, 120 a focal distance from the corresponding surface 142, 144. Subsequently, no further movement of the probe(s) 110, 120 is required to measure the surface topography and/or geometric parameter(s) of the corresponding surface 142, 144.

In other embodiments, after initializing the location of each probe 110, 120, the motion controller 150 may also coordinate the movement of the probe(s) 110, 120 with the movement of the lens mount 130 to ensure the distance between each surface 142, 144 of the lens 140 and the corresponding probe 110, 120 remains within the measurement range, e.g., focal length, of the corresponding probe 110, 120 for each of the plurality of x-y positions 156 of the test pattern 152. In some embodiments, the motion controller 150 controls the movement of the probe(s) 110, 120 according to an expected surface topography, e.g., a surface topography defined by an analytical equation or a 3D model. For example, if lens 140 comprises a convex first surface 142, the motion controller 150 will control the movement of the first probe 110 in the z-direction on the first side 106 of the test plane 104 according to the analytical equation defining the expected convex shape of the first surface 142 for each x-y position 156 of the test pattern 152 so that the first surface 142 stays within measurement range of the first probe 110 for each of the x-y positions 156. It will be appreciated that the first and second surfaces 142, 144 may have different expected surface topographies, and thus the motion controller 150 may control the movement of the first and second probes 110, 120 in the z-direction differently so that the first surface 142 on the first side 106 of the test plane 104 stays within the measurement range of the first probe 110 and the second surface 144 on the second side 108 of the test plane 104 stays within the measurement range of the second probe 120 for each of the x-y positions 156.

In other embodiments, one or both surfaces 142, 144 of the lens 140 may not have a topography easily defined by an analytical equation or a 3D model. In these embodiments, the motion controller 150 may receive feedback from the sensor 160 (captured by the corresponding probe 110, 120) regarding the distance between the probe(s) 110, 120 and the surface(s) 142, 144. Accordingly, in some embodiments the motion controller 150 moves at least one of the first and second probes 110, 120 along the vertical axis 102 responsive to feedback from the chromatic confocal sensor 160 to follow a contour of the corresponding one of the surfaces 142, 144 of lens 140. For example, the z-axis motion of one or both of the probes 110, 120 may be adaptively controlled (e.g., via autofocus) during a measurement by real-time feedback from the output of the sensor 160. In this example, a dual-frequency PID algorithm constantly nulls the real-time position error of the z-axis, thus keeping the surface 142, 144 at the mid-point of the measurement range (e.g., at 200 microns for a 0 to 400 micron probe measurement range).

It will be appreciated that the solution presented herein may simultaneously characterize the topography and/or geometric parameter(s) of more than two surfaces of a lens as long as each surface being characterized is within the measurement range of the corresponding probe 110, 120. An exemplary measurement range, which is defined by the optics of each probe 110, 120, is 500 microns. As such, because many lens coatings/films are less than 500 microns thick, the solution presented herein using probes with such a measurement range may also be used to characterize one or more films disposed on a surface 142, 144 of the lens 140. For example, optical test system 100 may simultaneously characterize lens surfaces as well as any films with a thickness less than the measurement range of the probe 110, 120 coating such surfaces by capturing not only the reflections (and thus the corresponding peak wavelengths) off the corresponding surface of the lens 140, but also by simultaneously capturing the reflections (and thus the corresponding peak wavelengths) off the external surface of the film (e.g., at the air-to-film interface) for each of the x-y positions 156. In other words, the probes 110, 120 capture chromatic reflections off any surface interfaces within the measurement range of the probes 110, 120. When a film is disposed on a surface, for example, the processor 170 has two peak wavelengths at each of the x-y positions, which the processor 170 may use to determine the surface topographies of the film and lens surface, as well as to determine the thickness of the film, e.g., from a difference between the distance to the lens surface (determined from the peak wavelength corresponding to the reflection off the lens surface) and the distance external surface of the film (determined from the peak wavelength corresponding to the reflection off the external surface of the film).

Consider the examples of FIGS. 4C and 4D, which show a lens 140 with a film 146, 148 on one or more surfaces 142, 144 of lens 140. Assume the first surface 142 of the lens 140 has a film 146 (FIG. 4C), where an outer surface 146a of the film 146 is spaced from an inner surface 146b of the film 146 by a distance $D_1$, and where the inner surface 146b is adjacent to the first surface 142 of the lens 140. In this example, the first probe 110 may measure all surfaces within the measurement range of the first probe 110 on the first side 106 of the test plane 104, e.g., not only the first surface 142 of the lens 140, but also the outer surface 146a of the film 146 (where the inner surface 146b of the film 146 is identical to the adjacent surface 142 of the lens 140) when all three surfaces 142, 146a, 146b are within the measurement range of the first probe 110, by evaluating the chromatic reflections off each surface and determining the peak wavelengths of each reflection. It will be appreciated that when the second surface 144 has a film 148 (FIG. 4D) where an outer surface 148a of the film 148 is spaced from an inner surface 148b of the film 148 by a distance $D_2$, and where the inner surface 146b is adjacent to the second surface 144 of the lens 140, the second probe 120 may measure all surfaces within the measurement range of the second probe 120 on the second side 108 of the test plane 104, e.g., not only the second surface 144 of the lens 140, but also the outer surface 148a of the film 148 when all three surfaces 144, 148a, 148b are within the measurement range of the second probe 120. In either case, the optical system may evaluate reflections off each surface, e.g., the outer film surface 146a, 148a, the inner film surface 146b, 148b (which corresponds to the adjacent surface, e.g., adjacent lens surface), etc., to characterize the surface topography and/or thickness of the corresponding film 146, 148. It will be appreciated that the solution presented herein applies when a film is disposed on one or both surfaces 142, 144 of the lens 140, and when one or both surfaces includes multiple films, as long as each surface being characterized is within the measurement range of the corresponding probe 110, 120 and as long as the thickness of the film 146, 148 is thicker than the minimum resolution of the optical test system 100.

FIG. 5 show an example of measuring the thickness $D_1$, $D_2$ of a film 146, 148 deposited on a lens surface 142, 144 using the optical test system 100 and method 200 of the solution presented herein. In this example of a chromatic confocal thickness measurement, an optical fiber (2) and coupler (3) transmits the light emitted from the light source (1) to the optical probe (4) 110, 120. The chromatic distance (and thus thickness measurements) for the film are carried out with the same optical probe 110, 120. The light on the return path (i.e., the reflections) are received by the corresponding probe 110, 120, and subsequently analyzed by the sensor 160. If there is a transparent material (5), i.e., film 146, 148, within the measurement range, the spectrum of the reflected light exhibits two peaks (6). Each peak is due to the reflection from one of the boundary surfaces, e.g., the outer surface 146a, 148a of the film 146, 148 and the inner surface 146b, 148b of the film 146, 148 (which corresponds to the lens surface 142, 144). The thickness $D_1$, $D_2$ can be determined from the spectral distance and the refractive index of the film material. This example assumes the minimum thickness of the film is known (to enable the two peaks to be distinguished), that the film 146, 148 is transparent, and that the film 146, 148 has a different refractive index than the lens 140 (or adjacent film/surface). It will be appreciated that in addition to measuring a thickness of a film 146, 148 deposited on a surface 142, 144 of a lens 140, the technique demonstrated in FIG. 5 may further be adapted to other evaluation operations, e.g., thickness of the lens 140 (if both surfaces 142, 144 are within the measurement range of one of the probes 110, 120). Further, it will be appreciated that the film characterization techniques disclosed herein apply to any known film, including but not limited to, lens films/coatings, plastic coatings, packaging films, liquid layers, liquid levels, etc.

Figure 6A:
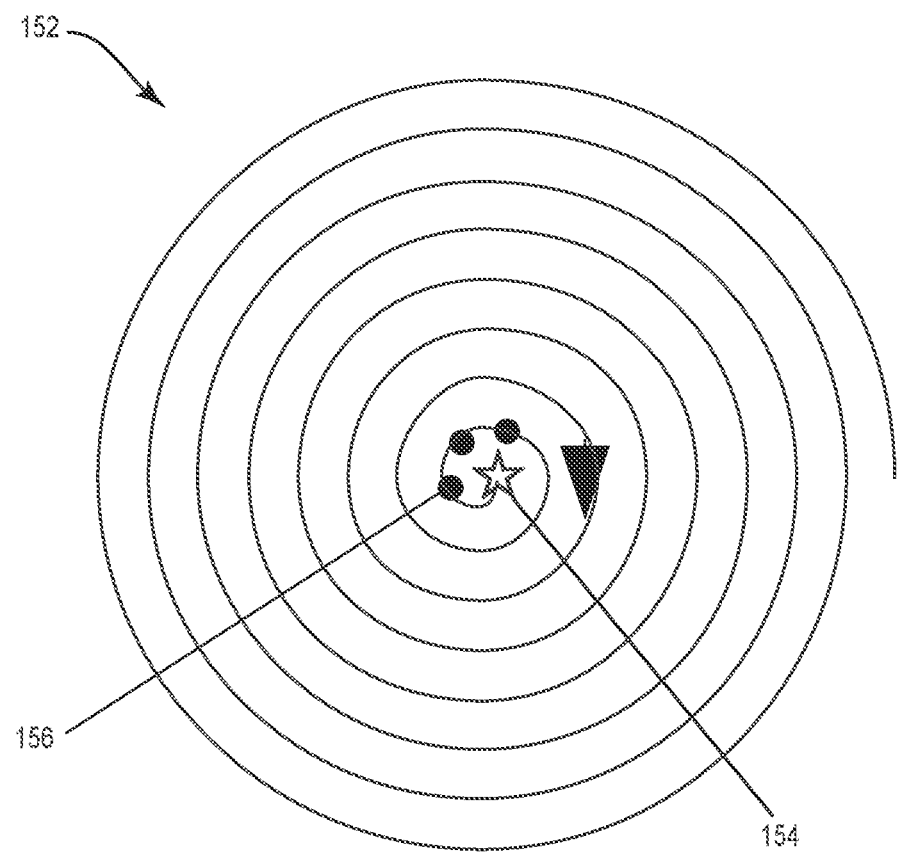
FIGS. 6A-6C show exemplary test patterns used by the solutions presented herein.
Figure 6B:
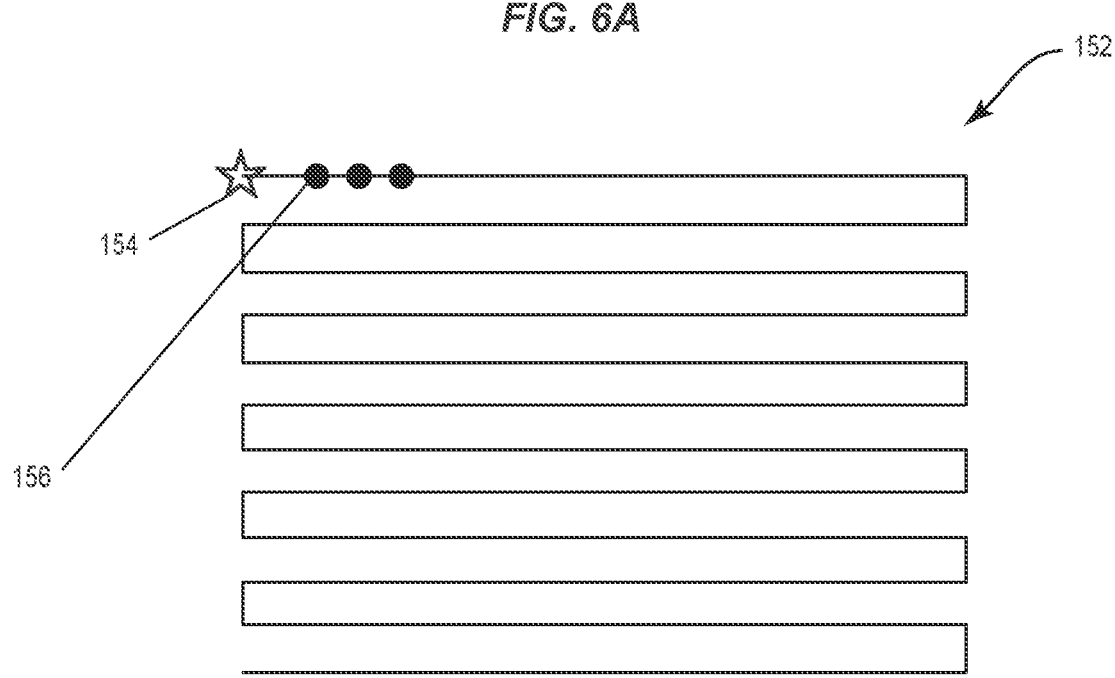
Figure 6C:
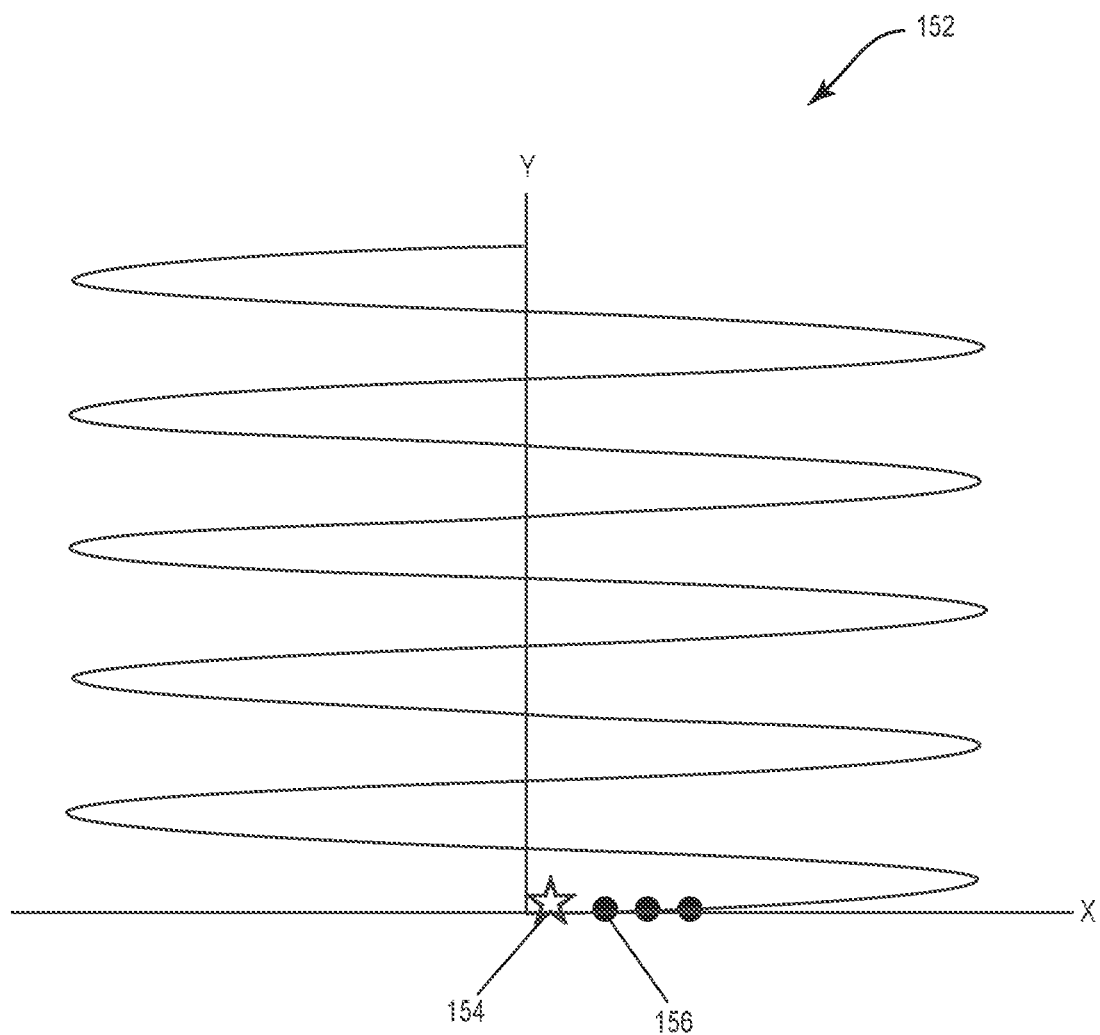

As discussed herein, the motion controller 150 moves the lens mount 130 in the test plane 104 so that each of a plurality of x-y positions 156 of a test pattern 152 aligns with the vertical axis 102, and thus aligns with the first and second probes 110, 120. FIGS. 6A-6C show exemplary test patterns 52. For example, the test pattern 152 may comprise a concentric test pattern, as shown in FIG. 6A or a raster pattern, as shown in FIG. 6B and in FIG. 6C. For simplicity and clarity, FIGS. 6A-6C only show a few x-y position 156 for each test pattern. It will be appreciated, however, that each test pattern 152 may comprise any number of the x-y positions 156. In other embodiments, the test pattern 152 may comprise a freeform pattern, which may be pre-programmed into the motion controller 150.

Regardless of which test pattern 152 is used, the motion controller 150 first initializes the location of the lens 140 in the test plane 104 to align a fiducial point of one of the first and second surfaces 142, 144 with the vertical axis 102, and thus with a starting point 154 of the test pattern 152 (see FIGS. 6A-6C). As shown in FIG. 4B, exemplary fiducial points include, but are not limited to, a centration point of the lens 140, e.g., a maximum point 141 of a surface curvature or a minimum point 143 of a surface curvature. It will be appreciated that if the surface curvature is convex, the minimum point 143 will be at the center while the maximum point 141 will be at the edges. It will further be appreciated that asymmetric surface curvatures will not necessarily have the maximum point 141 or the minimum point 143 at the center or edge of the lens 140. When the surface 142, 144 is flat, the fiducial point may be defined by the tilt of the surface. Regardless of the type of fiducial point used, the motion controller 150 aligns this fiducial point with the vertical axis 102 to place a starting point 154 of the test pattern 152 at the fiducial point to initialize the optical test system 100 before performing the process 200.

Figure 8:
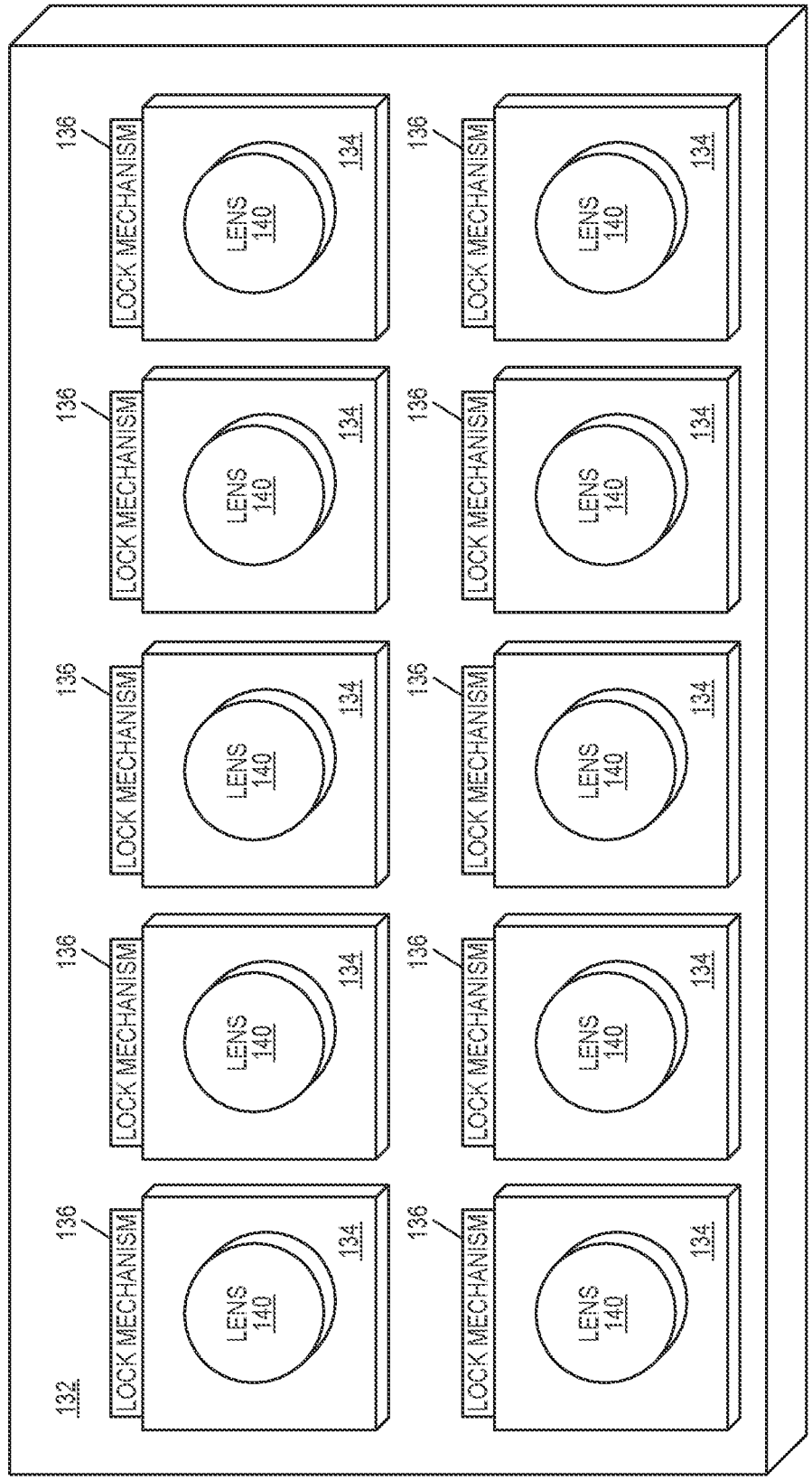
FIG. 8 shows another lens mount according to exemplary embodiments of the solutions presented herein.

As also noted herein, the lens mount 130 is configured to secure a lens 140 within the test plane 104 during the measurement process 200. To that end, lens mount 130 may comprise a tray 132, an insert 134, and a lock mechanism 136, as shown in FIG. 8. Tray 132 is configured to mechanically secure to a frame of the optical test system 100, as discussed further below, and includes an opening. The opening is constructed to hold the insert 134 using the lock mechanism 136. An inner portion of the insert 134 holds the lens 140 using any known means, while an outer portion of the insert 134 is mechanically configured to fit within the opening in the tray 132. For example, the top and bottom of the insert 134 may be machined or include a molded clam-shell clamp to hold the lens 140. Such an embodiment is useful for molded lenses with mounting flanges around the outer diameter, and/or for holding many small micro-lenses in the tray 132. In another example, e.g., most applicable for larger lenses, nylon tipped screws may be used to hold the lens 140 within the insert 134, e.g., where the nylon tipped set screws push against the outer diameter of the lens. In other exemplary embodiments, e.g., suitable for high volume production, the lens may be pre-mounted inside magnetic frames, which are held to the insert 134, e.g., by machining the insert 134 from 440C carbon chromium stainless steel, which is magnetic in all conditions. In still other exemplary embodiments, e.g., suitable for lenses used frequently for calibration, the lens 140 is potted (e.g., with epoxy or RTV) to the insert 134. Regardless of how the lens 140 is secured to the insert 134, such inserts 134 not only serves to hold the lens 140, but also serves to standardize the size of the element secured within the tray 132 of the lens mount 130. The lens mount 130 may therefore be configured to hold different sized lenses 140 simply by using the correct insert 134 for the corresponding lens 140. The lock mechanism 136 secures the insert 134 within the tray 132 using any known means. Exemplary lock mechanisms 136 include, but are not limited to, a screw lock mechanism and a magnetic lock mechanism.

Figure 7:
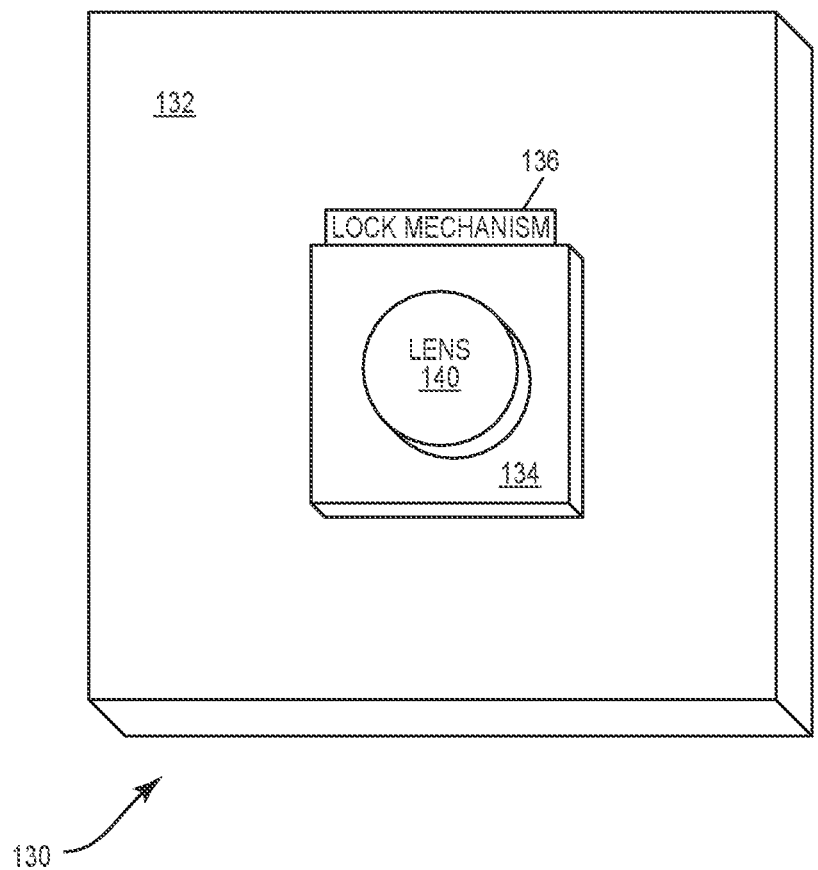
FIG. 7 shows a lens mount according to exemplary embodiments of the solutions presented herein.

In some embodiments, the lens mount 130 may be configured to hold a plurality of lenses, e.g., as shown in FIG. 8. In this example, the lens mount 130 includes a plurality of inserts 134, each of which holds a lens 140 and secures to the tray 132 via a corresponding lock mechanism 136. For such multi-lens lens mounts 130, the optical test system 100 may be configured to execute the method 200 for each lens 140 in the lens mount 130 after first initializing the location of the corresponding lens 140, e.g., by aligning the fiducial point of the lens 140 with the vertical axis 102. After such initialization is complete, the optical test system 100 executes method 200 for that lens 140. The initialization and lens evaluation processes are then repeated for each lens 140 in the lens mount 130. It will be appreciated that the solution presented herein does not require each lens 140 in mount 130 of FIG. 8 to be the same lens 140. Further, the solution presented herein does not require the lenses 140 be installed in the lens mount 130 according to a grid as shown in FIG. 7; any suitable pattern may be used. It will also be appreciated that the lens mount 130 may be configured to accommodate any number of lenses 140 greater than or equal to 1.

The speed at which the optical test system 100 moves the lens mount 130 to perform the surface evaluation, e.g., up to 10 kHz, may cause thermal and/or mechanical deviations (e.g., due to vibrations), which may lead to errors in the determined surface topographies and/or geometric parameter(s). To minimize these errors, the optical test system 100 disclosed herein has a frame system constructed from material having a coefficient of thermal expansion less than $1.5 \times 10^{-6}$ per degree Kelvin. Exemplary materials include, but are not limited to, granite or a nickel-iron alloy, e.g., 64FeNi.

Figure 9A:
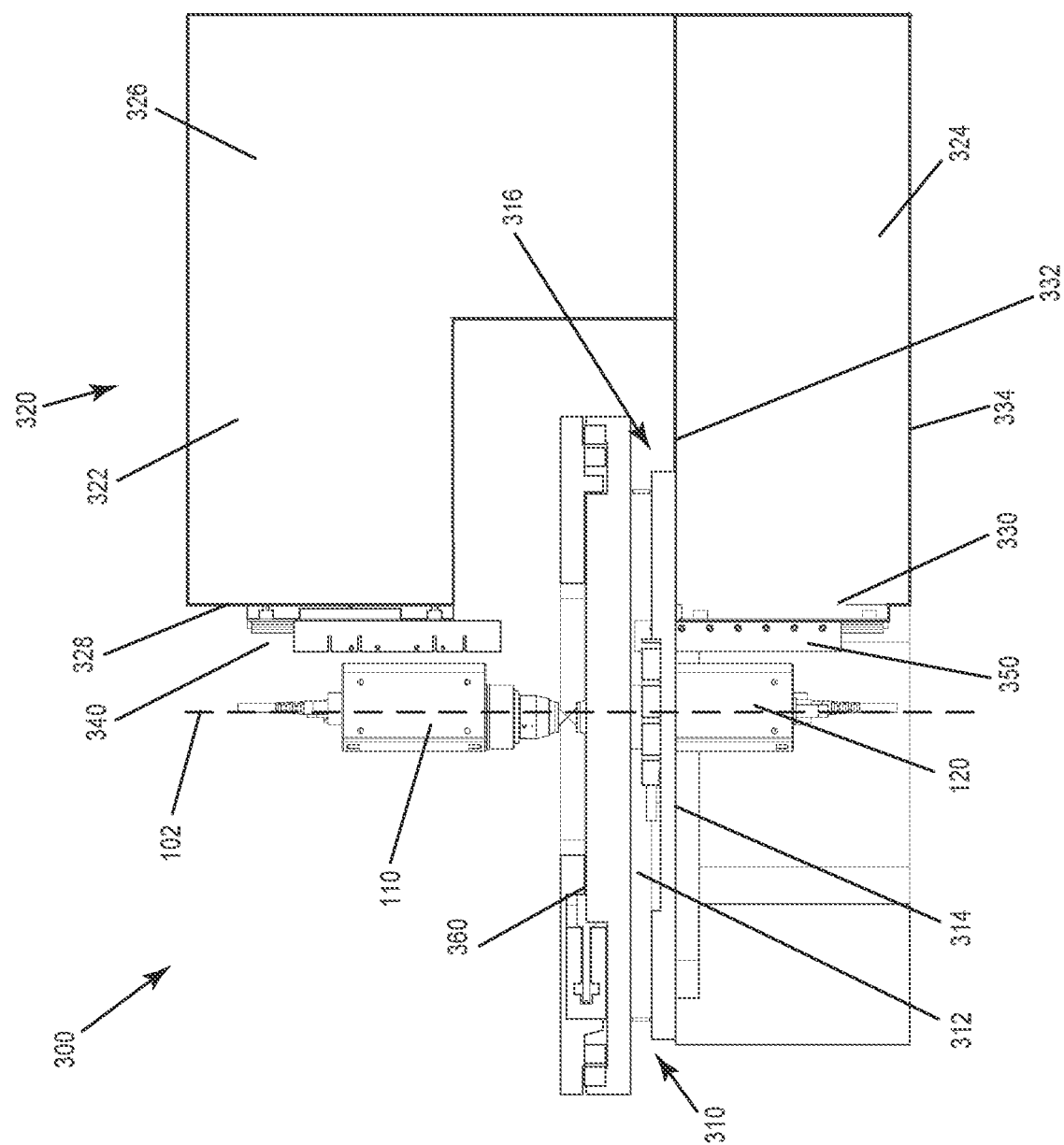
FIGS. 9A-9E show a frame system according to exemplary embodiments of the solutions presented herein.
Figure 9B:
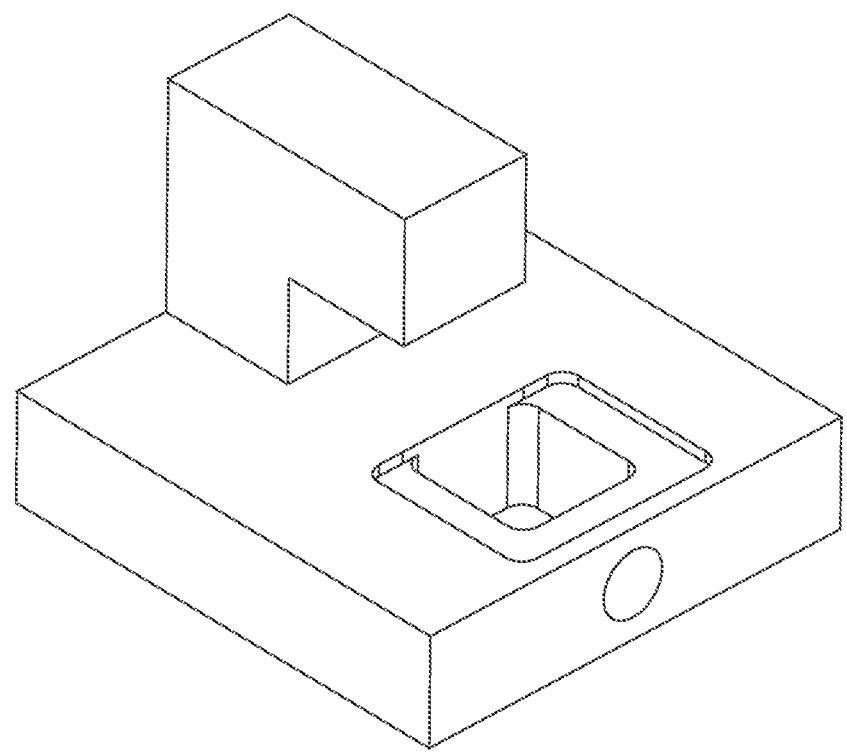
Figure 9C:
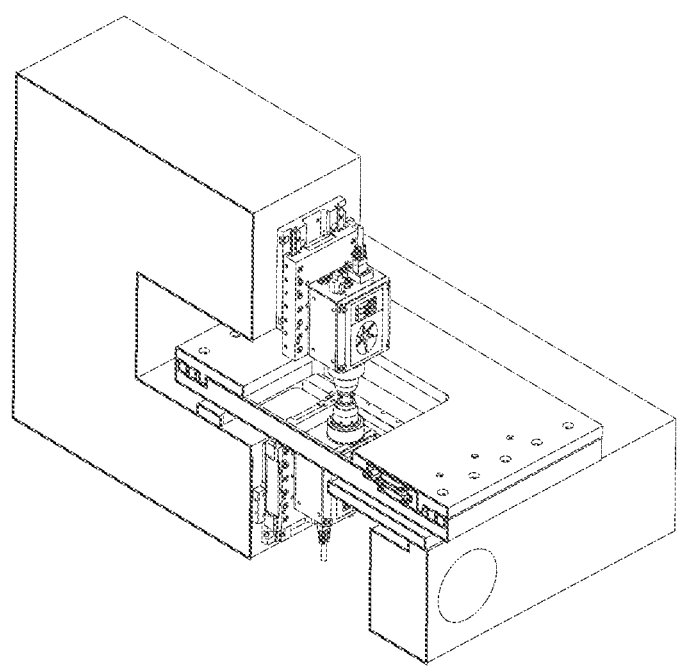
Figure 9D:
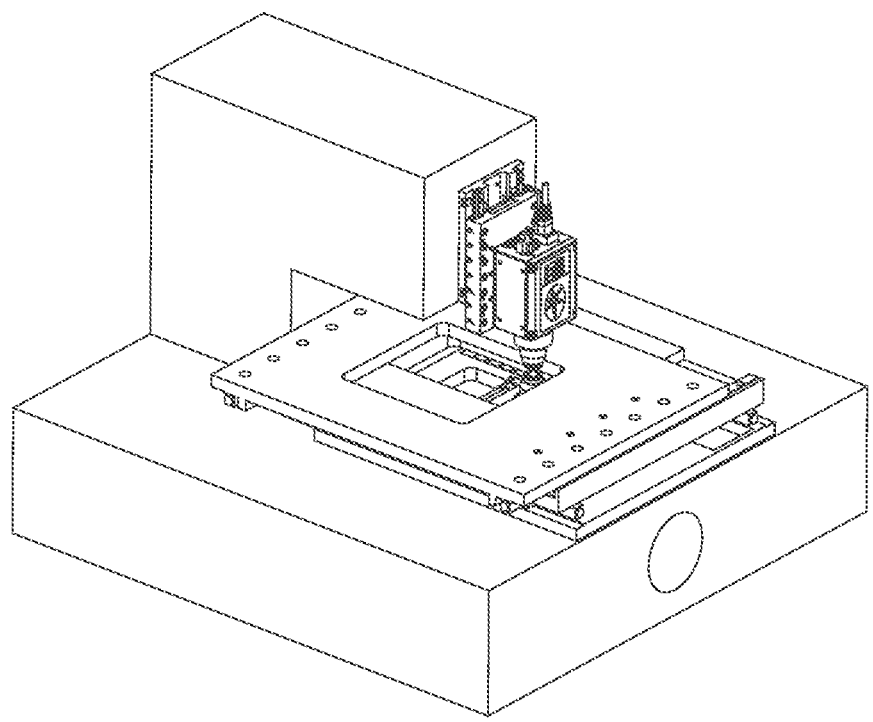
Figure 9E:
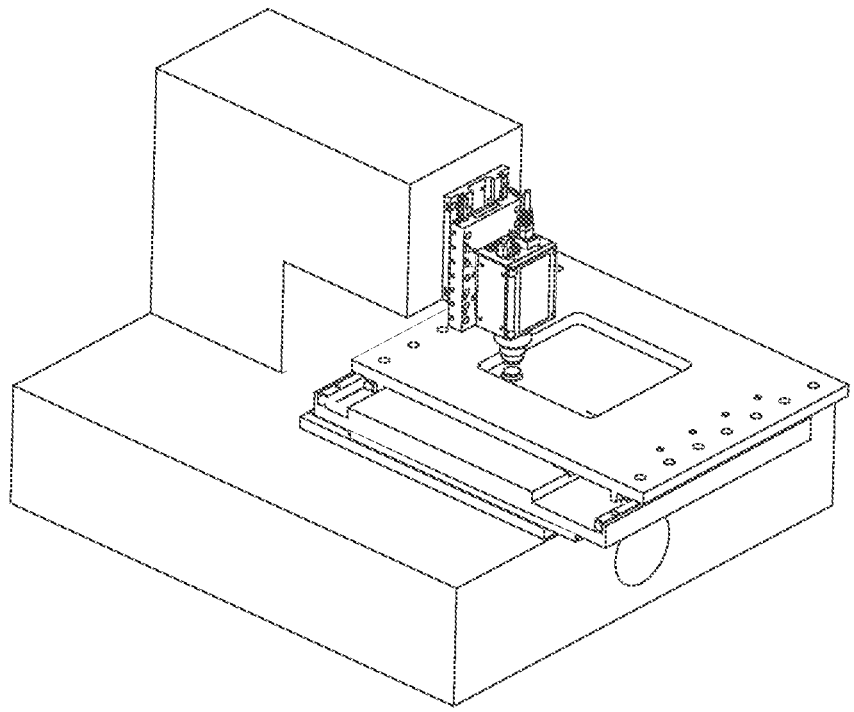

FIGS. 9A-9E show an exemplary frame system 300 constructed of such a material. The frame system 300 comprises a base plate 310 and a probe mounting plate 320. The base plate 310 is perpendicular to the vertical axis 102, and has a top surface 312 and a bottom surface 314 separated by a side surface 316. The probe mounting plate 320 comprises a generally "C" or "U" shaped structure constructed from a single piece of the desired material. As shown in FIG. 9A, the base plate 310 and probe mounting plate 320 are machined separately, where the probe mounting plate 320 is structurally secured to the base plate 310 using any known means. As shown in FIGS. 9B-9E, the base plate 310 and probe mounting plate 320 are machined from a single piece of material. In either exemplary embodiment, the probe mounting plate 320 comprises a first segment 322 having a first front surface 328, a second segment 324 having a second front surface 330, and a connecting segment 326 spanning from the first segment 322 to the second segment 324 around the side surface 316 of the base plate 310, where the first and second front surfaces 328, 330 are parallel to the vertical axis 102. As noted above, in the exemplary embodiment of FIG. 9A, the second segment 324 is structurally secured to the base plate 310. For example, the second segment 324 may comprise the second front surface 330 spanning between a top 332 and a bottom 334, where at least the top 332 is perpendicular to the second front surface 330. In this example, at least a portion of the top 332 of the second segment 324 is structurally secured to at least a portion of the bottom surface 314 of the base plate 310.

The base plate 310 and probe mounting plate 320 are configured to hold the translation stages 340, 350, 260 used to move the probes 110, 120 and lens mount 130. To that end, a first vertical translation stage 340 is mounted to the first front surface 328 and a second vertical translation stage 350 is mounted to the second front surface 330, while an x-y translation stage 360 is mounted to the top surface 312 of the base plate 310. The first probe 110 secures to the first vertical translation stage 340 and the second probe 120 secures to the second vertical translation stage 350 such that the first and second probes 110, 120 are centered on and aligned with the vertical axis 102 and face opposing sides 106, 108 of the test plane 104. Accordingly, the motion controller 150 move the first and second vertical translation stages 340, 350 to move the probes 110, 120 along the vertical axis 102 in the z-direction above and below, respectively, the test plane 104, e.g., to initialize the location of the probe(s) 110, 120 and/or follow the contour of the lens 140 being tested, as discussed further herein. The x-y translation stage 360 is mounted to the top surface 312 of the base plate 310 and between the first and second probes 110, 120. The x-y translation stage 360 is configured to move a lens mount 130 secured to the x-y translation stage 360 to move a lens 140 within the test plane 104 in the x- and/or y-directions, e.g., to initialize the location of the lens 140 relative to the vertical axis 102 and/or to move the lens 140 according to the test pattern 152, as disclosed herein. As shown in FIGS. 9A-9E (and particularly in the cross-sectional views of FIGS. 9C and 9D), the connecting segment 326 of the probe mounting plate 320 is sufficiently spaced from the side 316 of the base plate 310 to allow the x-y translation stage 360 to move according to the desired range of movement provided for the solution presented herein.

By constructing the frame system 300 as discussed herein from a low thermal coefficient material, and by mounting the moving components of the optical test system 100 to this frame system 300, the frame system 300 presented herein minimizes any deviations caused by vibrations and/or thermal changes during the surface topography/parameter evaluation. As such, the frame system 300 significantly improves the accuracy and efficiency of lens evaluations over conventional solutions.

The solution presented herein may, of course, be carried out in other ways than those specifically set forth herein without departing from essential characteristics of the proposed solution. The present embodiments are to be considered in all respects as illustrative and not restrictive, and all changes coming within the meaning and equivalency range of the appended claims are intended to be embraced therein.

What is claimed is:

1. An optical test system configured to simultaneously measure at least one of a surface topography and one or more geometric parameters of multiple surfaces of at least one lens, the optical test system comprising:
    first and second probes centered on a vertical axis and movable along the vertical axis, said first and second probes facing opposing first and second sides of a test plane, respectively, said first and second sides of the test plane perpendicular to the vertical axis;
    a lens mount configured to secure a lens in the test plane between the first and second probes, said lens having opposing first and second surfaces, said first surface of the lens on the first side of the test plane and said second surface of the lens on the second side of the test plane;
    a motion controller configured to move the lens mount within the test plane to each of a plurality of x-y positions of a test pattern while the first surface of the lens is in a first measurement range of the first probe and the second surface of the lens is in a second measurement range of the second probe for each of the plurality of x-y positions while the first and second probes:
    simultaneously focus chromatic light onto the corresponding first and second surfaces of the lens for each of the plurality of x-y positions; and
    simultaneously collect reflections of the chromatic light off of the corresponding first and second surfaces of the lens for each of the plurality of x-y positions;
    a chromatic confocal sensor operatively connected to the first and second probes and configured to detect a surface peak wavelength of each surface reflection off each of the first and second surfaces simultaneously collected by each of the first and second probes for each of the plurality of x-y positions; and
    a processor operatively connected to the chromatic confocal sensor and configured to:
        determine a plurality of geometric datum for the lens from a first subset of the detected surface peak wavelengths; and
        determine, for each of the first and second surfaces of the lens and relative to the geometric datum from the remaining detected surface peak wavelengths:
        the surface topography; or
        the one or more geometric parameters; or
        both the surface topography and the one or more geometric parameters.

2. The optical test system of claim 1 wherein the motion controller is further configured to coordinate the moving of the lens mount within the test plane with a moving of the first probe along the vertical axis on the first side of the test plane to maintain the first surface of the lens in the first measurement range for each of the plurality of x-y positions.

3. The optical test system of claim 2 wherein the motion controller is further configured to coordinate the moving of the lens mount within the test plane with a moving of the second probe along the vertical axis on the second side of the test plane to maintain the second surface of the lens in the second measurement range for each of the plurality of x-y positions.

4. The optical test system of claim 3 wherein the motion controller moves at least one of the first and second probes along the vertical axis according to an expected surface topography.

5. The optical test system of claim 4 wherein the expected surface topography comprises a topography defined by an analytical equation or by a 3D model.

6. The optical test system of claim 3 wherein the motion controller is further operatively connected to the chromatic confocal sensor, and where the motion controller moves at least one of the first and second probes along the vertical axis responsive to feedback from the chromatic confocal sensor to follow a contour of the corresponding one of the first surface and the second surface of the lens.

7. The optical test system of claim 6 wherein:
    the lens comprises a first film disposed on the first surface, said first film having a thickness defined by a distance between an outer surface of the first film and an inner surface of the first film adjacent the first surface;
    the motion controller is further configured to coordinate the moving of the lens mount within the test plane with the moving of the first probe along the vertical axis on the first side of the test plane to maintain the outer and inner surfaces of the first film in the first measurement range for each of the plurality of x-y positions while the first probe is further configured to:
    simultaneously focus chromatic light onto the corresponding outer surface of the first film for each of the plurality of x-y positions; and
    simultaneously collect reflections of the chromatic light off of the corresponding outer surface of the first film for each of the plurality of x-y positions;
    the chromatic confocal sensor is further configured to detect a first film peak wavelength of each film reflection off the outer surface of the first film collected by the first probe for each of the plurality of x-y positions; and
    the processor is further configured to determine at least one of:
        a surface topography of the outer surface of the first film from the detected first film peak wavelengths; and
        a thickness of the first film at each of the plurality of x-y positions from the detected first film peak wavelength and the corresponding surface peak wavelength for each of the plurality of x-y positions.

8. The optical test system of claim 7 wherein:
the lens comprises a second film disposed on the second surface, said second film having a thickness defined by a distance between an outer surface of the second film and an inner surface of the second film adjacent the second surface;
the motion controller is further configured to coordinate the moving of the lens mount within the test plane with the moving of the second probe along the vertical axis on the second side of the test plane to maintain the outer and inner surfaces of the second film in the second measurement range of the second probe for each of the plurality of x-y positions while the second probe is further configured to:
simultaneously focus chromatic light onto the corresponding outer surface of the second film for each of the plurality of x-y positions; and
simultaneously collect reflections of the chromatic light off of the corresponding outer surface of the second film for each of the plurality of x-y positions;
the chromatic confocal sensor is further configured to detect a second film peak wavelength of each film reflection off the outer surface of the second film collected by the second probe for each of the plurality of x-y positions; and
the processor is further configured to determine at least one of:
a surface topography of the outer surface of the second film from the detected second film peak wavelengths; and
a thickness of the second film at each of the plurality of x-y positions from the detected second film peak wavelength and the corresponding detected surface peak wavelength for each of the plurality of x-y positions.

9. The optical test system of claim 1 wherein:
the lens comprises a first film disposed on the first surface, said first film having a thickness defined by a distance between an outer surface of the first film and an inner surface of the first film adjacent the first surface;
the motion controller moves the lens mount within the test plane while the outer and inner surfaces of the first film are in the first measurement range for each of the plurality of x-y positions while the first probe is further configured to:
simultaneously focus chromatic light onto the corresponding outer surface of the first film for each of the plurality of x-y positions; and
simultaneously collect reflections of the chromatic light off of the corresponding outer surface of the first film for each of the plurality of x-y positions;
the chromatic confocal sensor is further configured to detect a first film peak wavelength of each film reflection off the outer surface of the first film collected by the first probe for each of the plurality of x-y positions; and
the processor is further configured to determine at least one of:
a surface topography of the outer surface of the first film from the detected first film peak wavelengths; and
a thickness of the first film at each of the plurality of x-y positions from the detected first film wavelength and the corresponding surface wavelength for each of the plurality of x-y positions.

10. The optical test system of claim 9 wherein:
the lens comprises a second film disposed on the second surface, said second film having a thickness defined by a distance between an outer surface of the second film and an inner surface of the second film adjacent the second surface;
the motion controller moves the lens mount within the test plane while the outer and inner surfaces of the second film are in the second measurement range for each of the plurality of x-y positions while the second probe is further configured to:
simultaneously focus chromatic light onto the corresponding outer surface of the second film for each of the plurality of x-y positions; and
simultaneously collect reflections of the chromatic light off of the corresponding outer surface of the second film for each of the plurality of x-y positions;
the chromatic confocal sensor is further configured to detect a second film peak wavelength of each film reflection off the outer surface of the second film collected by the second probe for each of the plurality of x-y positions; and
the processor is further configured to determine at least one of:
a surface topography of the outer surface of the second film from the detected second film peak wavelengths; and
a thickness of the second film at each of the plurality of x-y positions from the detected second film wavelength and the corresponding surface wavelength for each of the plurality of x-y positions.

11. The optical test system of claim 1 wherein the motion controller is further configured to initialize a location of the lens mount within the test plane by moving the lens mount within the test plane to align a starting point of the test pattern with at a fiducial point of at least one of the first and second surfaces of the lens.

12. The optical test system of claim 11 wherein the fiducial point comprises a maximum point or a minimum point of at least one of the first and second surfaces of the lens.

13. The optical test system of claim 1 wherein said first probe, said second probe, and said lens mount are secured to a frame system having a coefficient of thermal expansion less than $1.5 \times 10^{-6}$ per degree Kelvin, said frame system configured to:
align the first and second probes along the vertical axis on the opposing first and second sides of the test plane;
secure the lens mount in the test plane between the first and second probes; and
control motion deviations of the first and second probes and the lens mount due to thermal expansion and vibrations.

14. The optical test system of claim 13 wherein the frame system comprises a nickel-iron alloy frame system or a granite frame system.

15. The optical test system of claim 14 wherein the nickel-iron alloy comprises 64FeNi.

16. The optical test system of claim 13 wherein the frame system comprises:
a base plate comprising a test plane perpendicular to the vertical axis;
a probe mounting plate structurally secured to the base plate and comprising:
a first vertical segment parallel to the vertical axis and disposed above a top surface of the base plate;

a second vertical segment parallel to the vertical axis and disposed below a bottom surface of the base plate; and
a connecting segment spanning from the first vertical segment around a side surface of the base plate, and spaced from the side surface, to the second vertical segment; and
a first vertical axis translation stage mounted to a first front surface of the first vertical segment of the probe mounting plate, said first front surface parallel to the vertical axis, and said first vertical axis translation stage configured to move along the vertical axis above the top surface;
a second vertical axis translation stage mounted to a second front surface of the second vertical segment of the probe mounting plate, said second front surface parallel to the vertical axis, said second vertical axis translation stage configured to move along the vertical axis below the bottom surface.

17. The optical test system of claim 13 wherein the lens mount comprises:
a tray secured to the frame system;
an insert configured to hold the lens; and
a lock mechanism configured to secure the insert within the tray.

18. The optical test system of claim 17 wherein the lock mechanism comprises a set screw or a magnetic lock mechanism.

19. The optical test system of claim 1 wherein the test pattern comprises one of a concentric pattern, a raster pattern, and a freeform pattern.

20. The optical test system of claim 1 wherein:
the lens mount is configured to secure a plurality of lenses in the test plane, each of said plurality of lenses having corresponding ones of the opposing first and second surfaces; and
the motion controller is further configured to move the lens mount within the test plane to align a starting point of the test pattern with a fiducial point of one of the first and second surfaces of each lens before moving the lens mount for the corresponding lens to generate the reflections used by the processor to determine, for the corresponding lens:
the surface topography; or
the one or more geometric parameters; or
both the surface topography and the one or more geometric parameters.

21. The optical test system of claim 1 wherein the plurality of geometric datum comprises at least two of tilt datum, clock datum, and centration datum.

22. A method of measuring at least one of a surface topography and one or more geometric parameters of multiple surfaces of at least one lens using an optical test system comprising first and second probes centered on a vertical axis and movable along the vertical axis, said first and second probes facing opposing first and second sides of a test plane, respectively, said first and second sides of the test plane perpendicular to the vertical axis, and a lens mount configured to secure a lens in the test plane between the first and second probes, said lens having opposing first and second surfaces, said first surface of the lens on the first side of the test plane and said second surface of the lens on the second side of the test plane, the method comprising:
moving the lens mount within the test plane to each of a plurality of x-y positions of a test pattern while the first surface of the lens is in a first measurement range of the first probe and the second surface of the lens is in a second measurement range of the second probe for each of the plurality of x-y positions, wherein the first and second probes:
simultaneously focus chromatic light onto the corresponding first and second surfaces of the lens for each of the plurality of x-y positions; and
simultaneously collect reflections of the chromatic light for each of the plurality of x-y positions;
detecting a first and second surface peak wavelength of each reflection off the first and second surfaces simultaneously collected by each of the first and second probes, respectively, for each of the plurality of x-y positions;
determining a plurality of geometric datum for the lens from a first subset of the detected first and second peak wavelengths; and
determining, for each of the first and second surfaces of the lens and relative to the geometric datum from the remaining detected first and second peak wavelengths:
the surface topography; or
the one or more geometric parameters; or
both the surface topography and the one or more geometric parameters.

23. The method of claim 22 further comprising coordinating the moving of the lens mount within the test plane with a moving of the first probe along the vertical axis on the first side of the test plane to maintain the first surface of the lens in the first measurement range for each of the plurality of x-y positions.

24. The method of claim 23 further comprising coordinating the moving of the lens mount within the test plane with a moving of the second probe along the vertical axis on the second side of the test plane to maintain the second surface of the lens in the second measurement range for each of the plurality of x-y positions.

25. The method of claim 24 wherein moving the first and second probes comprises moving at least one of the first and second probes along the vertical axis according to an expected surface topography.

26. The method of claim 25 wherein the expected surface topography comprises a topography defined by an analytical equation or by a 3D model.

27. The method of claim 24 wherein moving the first and second probes comprises moving at least one of the first and second probes along the vertical axis responsive to feedback from a chromatic confocal sensor to follow a contour of the corresponding one of the first and second surfaces of the lens.

28. The method of claim 27 wherein the lens comprises a first film disposed on the first surface, said first film having a thickness defined by a distance between an outer surface of the first film and an inner surface of the first film adjacent the first surface, the method further comprising:
coordinating the moving of the lens mount within the test plane with the moving of the first probe along the vertical axis on the first side of the test plane to maintain the outer and inner surfaces of the first film in the first measurement range for each of the plurality of x-y positions while the first and second probes:
simultaneously focus chromatic light onto the corresponding outer surface of a first film lens for each of the plurality of x-y positions; and
simultaneously collect reflections of the chromatic light off of the corresponding outer surface of the first film for each of the plurality of x-y positions;

detecting a first film peak wavelength of each film reflection off the outer surface of the first film collected by the first probe for each of the plurality of x-y positions; and determining at least one of:
a surface topography of the outer surface of the first film from the detected first film peak wavelengths; and
a thickness of the first film at each of the plurality of x-y positions from the detected first film peak wavelength and the corresponding surface peak wavelength for each of the plurality of x-y positions.

29. The method of claim 28 wherein the lens comprises a second film disposed on the second surface, said second film having a thickness defined by a distance between an outer surface of the second film and an inner surface of the second film adjacent the second surface, the method further comprising:
coordinating the moving of the lens mount within the test plane with the moving of the second probe along the vertical axis on the second side of the test plane to maintain the outer and inner surfaces of the second film in the second measurement range for each of the plurality of x-y positions while the first and second probes:
simultaneously focus chromatic light onto the corresponding outer surface of a second film lens for each of the plurality of x-y positions; and
simultaneously collect reflections of the chromatic light off of the corresponding outer surface of the second film for each of the plurality of x-y positions;
detecting a second film peak wavelength of each film reflection off the outer surface of the second film collected by the second probe for each of the plurality of x-y positions; and
determining at least one of:
a surface topography of the outer surface of the second film from the detected second film peak wavelengths; and
a thickness of the second film at each of the plurality of x-y positions from the detected second film peak wavelength and the corresponding surface peak wavelength for each of the plurality of x-y positions.

30. The method of claim 22 wherein:
the lens comprises a first film disposed on the first surface, said first film having a thickness defined by a distance between an outer surface of the first film and an inner surface of the first film adjacent the first surface;
the moving the lens mount within the test plane comprises moving the lens mount within the test plane while the outer and inner surfaces of the first film are in the first measurement range for each of the plurality of x-y positions while the first probe is further configured to:
simultaneously focus chromatic light onto the corresponding outer surface of the first film for each of the plurality of x-y positions; and
simultaneously collect reflections of the chromatic light off of the corresponding outer surface of the first film for each of the plurality of x-y positions;
the method further comprising:

detecting a first film peak wavelength of each film reflection off the outer surface of the first film collected by the first probe for each of the plurality of x-y positions; and determining at least one of:
a surface topography of the outer surface of the first film from the detected first film peak wavelengths; and
a thickness of the first film at each of the plurality of x-y positions from the detected first film peak wavelength and the corresponding surface peak wavelength for each of the plurality of x-y positions.

31. The method of claim 30 wherein:
the lens comprises a second film disposed on the second surface, said second film having a thickness defined by a distance between an outer surface of the second film and an inner surface of the second film adjacent the second surface;
the moving the lens mount within the test plane comprises moving the lens mount within the test plane while the outer and inner surfaces of the second film are in the second measurement range for each of the plurality of x-y positions while the second probe is further configured to:
simultaneously focus chromatic light onto the corresponding outer surface of the second film for each of the plurality of x-y positions; and
simultaneously collect reflections of the chromatic light off of the corresponding outer surface of the second film for each of the plurality of x-y positions;
the method further comprising:
detecting a second film peak wavelength of each film reflection off the outer surface of the second film collected by the first probe for each of the plurality of x-y positions; and
determining at least one of:
a surface topography of the outer surface of the second film from the detected second film peak wavelengths; and
a thickness of the second film at each of the plurality of x-y positions from the detected second film peak wavelength and the corresponding surface peak wavelength for each of the plurality of x-y positions.

32. The method of claim 22 further comprising initializing a location of the lens mount within the test plane by moving the lens mount within the test plane to align a starting point of the test pattern with a fiducial point of at least one of the first and second surfaces of the lens.

33. The method of claim 32 wherein the fiducial point comprises a maximum point or a minimum point of at least one of the first and second surfaces the lens.

34. The method of claim 22 wherein the test pattern comprises one of a concentric pattern, a raster pattern, and a free-form pattern.

* * * * *